Sept. 30, 1930.    J. KEGEL    1,777,276
MACHINE FOR THE PRODUCTION IN MOLDS OF BODIES COVERED
WITH CHOCOLATE OR SIMILAR PLASTIC MASSES
Filed Jan. 7, 1928
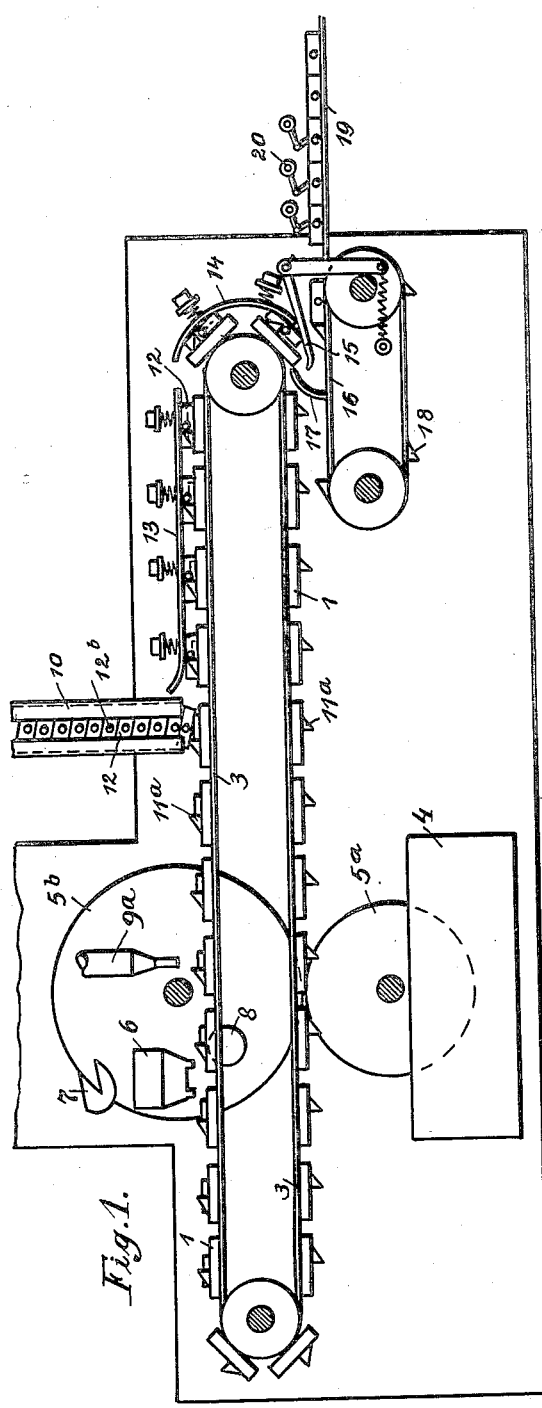
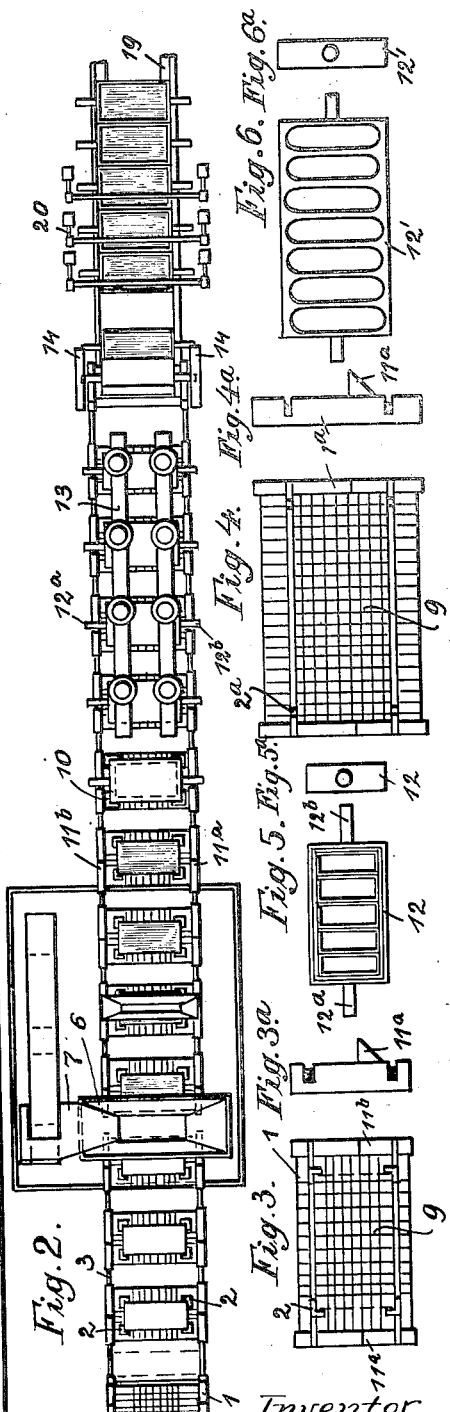
Inventor
Johannes Kegel
by
Attorney Patented Sept. 30, 1930

1,777,276

UNITED STATES PATENT OFFICE

JOHANNES KEGEL, OF DRESDEN, GERMANY

MACHINE FOR THE PRODUCTION IN MOLDS OF BODIES COVERED WITH CHOCOLATE OR SIMILAR PLASTIC MASSES

Application filed January 7, 1928, Serial No. 245,193, and in Germany January 11, 1927.

The production of cream chocolates has hitherto generally been carried out by pressing the cream center by hand into a mold filled with chocolate, a stripper being used to level off or remove the excess coating material. In machines working on this principle the mold is supplied with a preliminary amount of chocolate, the cream center then pressed into the chocolate and a top layer of chocolate is then applied. This process has always left much to be desired from the point of view of amount of output, and is messy and wasteful in the use of material.

The present invention provides a machine which coats the centers and presses the coated centers into molds and thus renders a further coating unnecessary. The work proceeds in this manner: The cream centers are first placed in framelike trays, which are furnished with registering projections in order to avoid displacement of the centers, and the forward movement of which is performed by an endless conveyor. The trays and the centers therein are taken through a well-known type of coating apparatus and then led under a pile of molds, from which the undermost mold, by means of a special apparatus on the tray and the mold, drops off and becomes situated on top of the coated center and its tray, the mold resting upon the registering projections. During the further progress of tray, coated unit and overlying mold, the mold is automatically pressed upon the coated unit, or the unit into the mold, while at the same time the registering projections are depressed. Thus, the coated unit is given the desired shape. In order to scrape off the superfluous material and at the same time to be able to level the bottom surface of the coated unit, the trays are automatically inverted, whereby the filled molds are forced to leave the trays and conducted to a traveling band. The traveling band leads the filled molds to a stripping apparatus so that the base of the coated unit is smoothed and leveled. From the scraper, the filled molds travel to shaking and cooling devices, which in themselves are well-known.

An embodiment of the invention is illustrated, by way of example, in the accompanying drawing, in which:—

Fig. 1 shows the whole apparatus in side elevation, and

Fig. 2 in plan.

Figs. 3 and $3^a$ and 4 and $4^a$ show top plan and end views of two different forms of trays, and Figs. 5 and $5^a$ and 6 and $6^a$ show top plan and end views of two different forms of molds.

The interchangeable trays 1 or $1^a$ with depressible spring-pressed projections 2 or $2^a$ serve to receive the center to be coated. The endless feed chain conveyor 3 carries the trays, which are placed thereon at regular intervals. From a container 4 the coating material is taken up in a well-known manner by means of disks $5^a$ and $5^b$ and removed by a scraper 7 from the disk $5^b$ for supply by gravity to a feed hopper or container 6. From the container 6 the coating material flows into the trays, and over centers, passing beneath it. A base covering roller 8 acts as each tray passes over it to press upon the screen bottom 9 of the tray to retain the coating material therein and to coat the base of the center with such material. A blower $9^a$ regulates the thickness of the coating. After the coating, the tray runs under the pile of reversible molds 10, whereby lugs $11^a$ and $11^b$ on the tray strike against the projections $12^a$ or $12^b$ of the lowest mold 12 or 12' and thus carry along with it the mold, the end journals of which rest on the registering projections 2 or $2^a$ of the tray. The mold is then pressed downward, as it travels, by the spring-actuated bars 13 so that the registering projections 2 are depressed and the mold allowed to settle firmly on the coated center. When traveling through the descending arc at one end of the conveyor the molds are inverted and are prevented from falling off the trays by an adjustable spring-actuated guide 14 and by their contact with a depressible conducting arm 15. By reason of the pressure of the molds on the arm 15, the arm 15 drops so far that the mold with its contents separates by gravity from the tray and passes onto the delivery band or conveyor 16. The relifting of the conducting arm is performed by a spring. The safety separator 17 compels these molds which have not done so by gravity, to be separated from the trays. The conveying band 16 has lugs 18 which push the molds one after the other onto the shelf 19. The stripping apparatus 20 removes excessive material from the filled molds and thus smooths the upper surface of the coated article. After stripping, the coated centers in the molds may be subjected to further processes. The whole machine can be so arranged that trays and molds of any desired shape can be used. Figs 3 and 3$^a$, for example, show a form of tray 1 for use with a mold 12 comprising a casing containing a plurality of removable mold chambers, while Figs. 4 and 4$^a$ show a form of tray 1$^a$ for use with a mold 12' shown in Figs. 6 and 6$^a$, said mold comprising a solid block having mold cavities formed therein.

I claim:—

1. In a machine for applying chocolate or other coating material to confectionery centers or fillings, an endless feed conveyor, trays on said conveyor to support the centers, means for applying the coating material to the centers on the successive trays, a column of molds arranged in the path of travel of the trays, coacting means on the trays and molds to cause each tray to remove the lowermost mold from the column and dispose the mold upon the tray for the shaping of the article therein, a delivery conveyor, and means arranged in the path of descent of the delivery end of the feed conveyor for separating the molds from the trays and depositing said molds upon the delivery conveyor.

2. In a machine for applying chocolate or other coating material to confectionery centers or fillings, an endless feed conveyor, spaced trays arranged on said conveyor to support the centers, said trays having open tops and perforate bottoms, means for introducing the coating material into the trays through the open tops and perforate bottoms thereof, a column of molds arranged in the path of travel of the trays, coacting means on the trays and molds to cause each tray to remove the lowermost mold from the column and dispose the mold upon the tray for the shaping of the article therein, a delivery conveyor, and means arranged in the path of descent of the delivery end of the feed conveyor for separating the molds from the trays and depositing said molds upon the delivery conveyor.

3. In a machine for applying chocolate or like coating material to confectionery centers or fillings, an endless feed conveyor, trays arranged on said conveyor to support the centers, means for supplying the coating material to the centers on the successive trays, a column of molds arranged in the path of travel of the trays, coacting means on the trays and molds to cause each tray to remove the lowermost mold from the column and dispose the mold upon the tray for the shaping of the article therein, a presser for pressing the molds down upon the trays, a delivery conveyor, and means arranged between the presser and the delivery conveyor and in the path of descent of the delivery end of the feed conveyor for separating the molds from the trays and depositing said molds upon the delivery conveyor.

4. In a machine for applying chocolate or other coating material to confectionery centers or fillings, an endless feed conveyor, trays arranged in spaced relation on said conveyor to support the centers, said trays having open tops and perforate bottoms, means for applying the coating material from above and below to the centers on the successive trays through the open top and perforate bottom of each tray, a column of molds arranged in the path of travel of the trays, coacting means on the trays and molds to cause each tray to remove the lowermost mold from the column and dispose the mold upon the tray for the shaping of the article therein, a presser for forcing the molds down upon the trays, a delivery conveyor, and means arranged between the presser and delivery conveyor and in the path of descent of the delivery end of the feed conveyor for separating the molds from the trays and depositing said molds upon the delivery conveyor.

5. In a machine for applying chocolate or other coating material to confectionery centers or fillings, an endless feed conveyor, trays arranged in spaced relation on said conveyor to support the centers, means for applying the coating material to the centers on the successive trays, a column of molds arranged in the path of travel of the trays, coacting means on the trays and molds to cause each tray to remove the lowermost mold from the column and dispose the mold upon the tray for the shaping of the article therein, a presser for forcing the molds down upon the trays, a guide device for supporting the molds passing to inverted position around the delivery end of the feed conveyor, a delivery conveyor below the delivery end of the feed conveyor, and a depressible device for engaging and supporting the inverted molds and permitting the same to separate by gravity from the trays and to drop easily upon the delivery conveyor.

6. In a machine for applying chocolate or other coating material to confectionery centers or fillings, an endless feed conveyor, trays arranged in spaced relationship on said conveyor to support the centers, said trays having open tops and perforate bottoms, means for supplying the coating material from above and below to the centers on the successive trays through the open top and perforate bottom of each tray, a column of molds arranged in the path of travel of the trays, coacting means on the trays and molds to cause each tray to remove the lowermost mold from the column and dispose the mold upon the tray for the shaping of the article therein, a guide device for supporting the molds passing to inverted position around the delivery end of the feed conveyor, a delivery conveyor below the delivery end of the feed conveyor, and a depressible device for engaging and supporting the inverted molds and permitting the same to separate by gravity from the trays and to drop easily upon the delivery conveyor.

7. In a machine for applying chocolate or other coating material to confectionery centers or fillings, an endless feed conveyor, trays arranged in spaced relationship on said conveyor to support the centers, said trays having open tops and perforate bottoms, means for supplying the coating material from above and below to the centers on the successive trays through the open top and perforate bottom of each tray, a column of molds arranged in the path of travel of the trays, coacting means on the trays and molds to cause each tray to remove the lowermost mold from the column and dispose the mold upon the tray for the shaping of the article therein, a guide device for supporting the molds and maintaining them in engagement with the trays while said molds are being inverted in passing around the delivery end of the feed conveyor, a depressible device arranged to be engaged and depressed by the molds beyond the guide device for supporting the molds during their travel between the guide device and the delivery conveyor and permitting the molds to separate by gravity from the trays, and a member for disengaging any mold from a tray which has not been separated by gravity therefrom.

8. In a machine for applying chocolate or other coating material to confectionery centers or fillings, an endless feed conveyor, trays on said conveyor to support the centers, means for applying the coating material to the centers on the successive trays, a column of molds arranged in the path of travel of the trays, coacting means on the trays and molds to cause each tray to remove the lowermost mold from the column and dispose the mold upon the tray for the shaping of the article therein, a guide device for supporting the molds and maintaining them in engagement with the trays while said molds are being inverted in passing around the delivery end of the feed conveyor, a depressible device arranged to be engaged and depressed by the molds beyond the guide device for supporting the molds during their travel between the guide device and the delivery conveyor and permitting the molds to separate by gravity from the trays, and a member for disengaging any mold from a tray which has not been separated by gravity therefrom.

In testimony whereof I affix my signature.
JOHANNES KEGEL.